(12) United States Patent
Stevens

(10) Patent No.: US 6,324,781 B1
(45) Date of Patent: Dec. 4, 2001

(54) MULCH OR SEED MAT

(76) Inventor: Ian Lawrence Stevens, 246 Bogangar Road, Cudgen in the State of New South Wales (AU)

( * ) Notice: Subject to any disclaimer, the term of this patent is extended or adjusted under 35 U.S.C. 154(b) by 0 days.

(21) Appl. No.: 09/285,405

(22) Filed: Apr. 2, 1999

Related U.S. Application Data

(63) Continuation-in-part of application No. 08/836,238, filed as application No. PCT/AU95/00720 on Oct. 30, 1995.

(30) Foreign Application Priority Data

Oct. 28, 1994 (AU) .................................................. PM 9076
Mar. 29, 1995 (AU) .................................................. 16115/95

(51) Int. Cl.[7] ........................................................ C09K 17/52
(52) U.S. Cl. .................................................................. 47/9
(58) Field of Search ....................... 47/9, 56, 65.9, 47/65.5

(56) References Cited

U.S. PATENT DOCUMENTS

| | | | |
|---|---|---|---|
| 3,664,061 | 5/1972 | Oepen | 47/56 |
| 3,703,786 | * 11/1972 | Swan | 47/56 |
| 4,062,145 | * 12/1977 | Gidge | 47/9 |
| 4,082,280 | 4/1978 | Lang | 273/102 B |
| 4,141,949 | 2/1979 | Hinojosa et al. | 264/134 |
| 4,148,952 | 4/1979 | Nelson et al. | 428/2 |
| 4,369,054 | 1/1983 | Shinholster et al. | 47/56 |
| 4,414,776 | 11/1983 | Ball | 47/56 |
| 4,576,801 | 3/1986 | Parry et al. | 427/288 |
| 4,584,790 | * 4/1986 | Gaughen | 47/56 |
| 4,773,168 | * 9/1988 | Lamos et al. | 34/48 |
| 4,949,655 | * 8/1990 | Greer et al. | 110/346 |
| 5,161,915 | 11/1992 | Hansen | 405/129 |
| 5,195,251 | * 3/1993 | Gyurcsek et al. | 34/191 |
| 5,207,020 | 5/1993 | Aslam et al. | 47/56 |
| 5,213,857 | 5/1993 | Erkkilä | 428/34.1 |
| 5,274,951 | 1/1994 | Besing | 47/56 |
| 5,275,508 | 1/1994 | Hansen | 405/129 |
| 5,301,460 | 4/1994 | Corbitt | 47/9 |
| 5,302,794 | * 4/1994 | Gustafson | 219/688 |
| 5,344,470 | * 9/1994 | Molnar et al. | 47/58 |
| 5,363,593 | 11/1994 | Hsh | 47/59 |
| 5,367,739 | * 11/1994 | Johnson | 15/316.1 |
| 5,373,646 | * 12/1994 | Wosnitza et al. | 34/256 |
| 5,390,442 | * 2/1995 | Behrens | 47/59 |
| 5,463,821 | * 11/1995 | Gauer | 34/261 |
| 5,608,989 | * 3/1997 | Behrens | 47/65.9 |
| 5,759,225 | * 6/1998 | Tanoshima | 71/24 |

FOREIGN PATENT DOCUMENTS

| | | |
|---|---|---|
| 52189/79 | 5/1980 | (AU) . |
| 64756/94 | 12/1994 | (AU) . |
| 28 29 324 | 1/1980 | (DE) . |
| 42 19 275 | 12/1993 | (DE) . |
| 1 574 006 | 9/1980 | (GB) . |
| 2 170 795 | 8/1986 | (GB) . |
| WO 92/08588 | 5/1988 | (WO) . |

OTHER PUBLICATIONS

W. Benton, Encyclopedia Britannica, vol. 17, pp. 238A–238B, 1961, "Papier–Mâche."

* cited by examiner

*Primary Examiner*—Peter M. Poon
*Assistant Examiner*—Jeffrey L. Gellner
(74) *Attorney, Agent, or Firm*—Oblon, Spivak, McClelland, Maier & Neustadt, P.C.

(57) ABSTRACT

A mat for use in horticultural applications is formed of shredded paper. The mat is formed by treating the paper with an adhesive, depositing the paper onto a conveyor, compressing the paper between rollers, and drying the paper using dryers. The mat may also incorporate seed or other additives such as fertilizers, herbicides or pesticides.

19 Claims, 3 Drawing Sheets

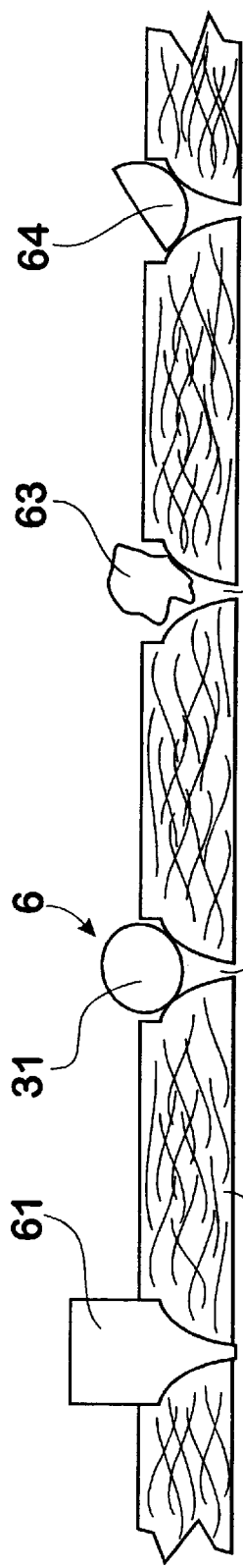
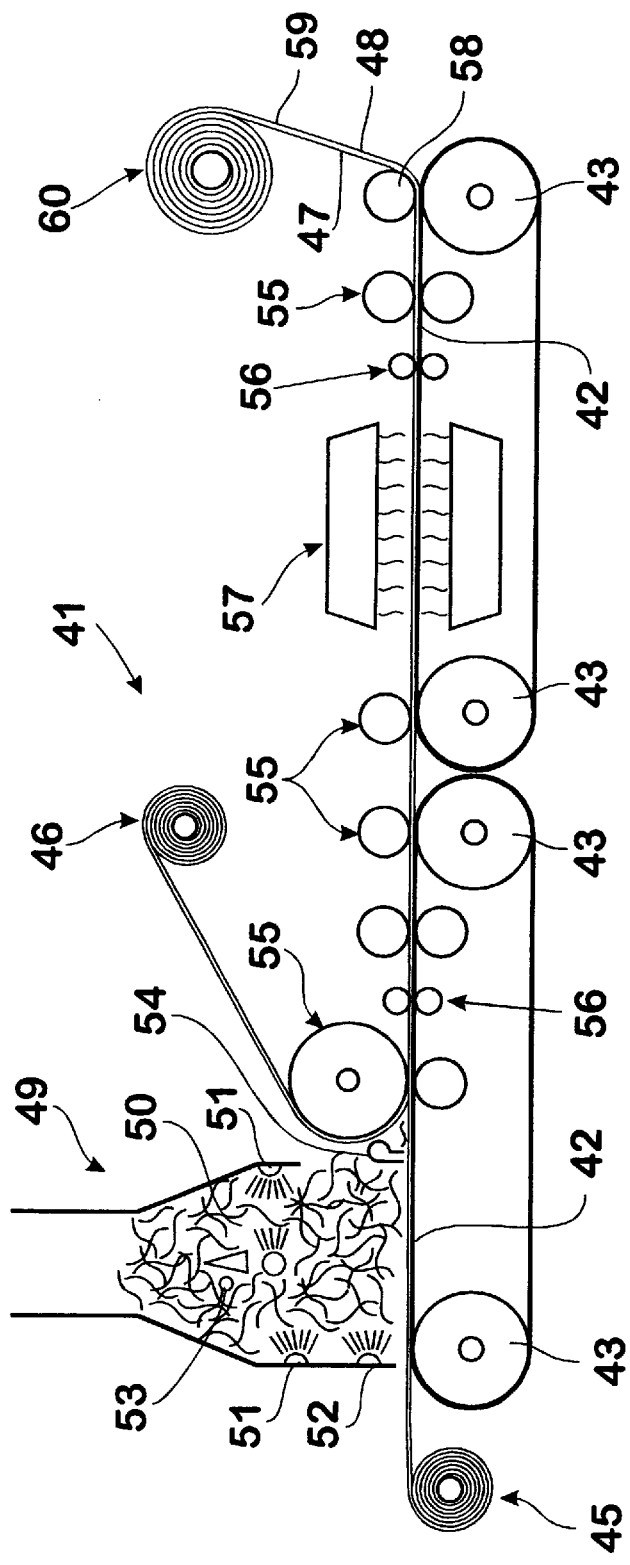
Fig. 7
Fig. 6

MULCH OR SEED MAT

This application is a Continuation-in-part of application Ser. No. 08/836,238 filed on Apr. 28, 1997, pending, which is a PCT application of international PCT/AU95/00720, filed Oct. 30, 1995.

BACKGROUND OF THE INVENTION

1. Technical Field

This invention relates to a mat which, in one aspect, is designed for promoting plant growth and/or limiting growth of weeds around plants and which, in another aspect, may incorporate seeds for establishing a growth of grass, lawn or other plants.

2. Description of Related Art

Seed mats of a number of different forms are known, some of which incorporate paper. Generally, however, the paper is used as a backing for carrying a mulch material, such as straw and the paper itself does not serve as the carrier or supporter of the seed. Alternatively, when paper is used in such mats, it is in the form of a wet paper pulp or slurry. Other forms of mulching products are also known, using different types of materials, such as straw or wood. Mulching products which use recycled or waste paper, however, do not appear to be presently available.

SUMMARY OF INVENTION

The present invention aims to provide a mat for horticultural applications which, in a first aspect, is for use primarily in mulching applications and which comprises substantially a paper material, and preferably a recycled paper material. The present invention also aims in a further aspect to provide a seed mat incorporating such a paper material. The present invention aims, in yet a further aspect, to provide a method for manufacturing a mulch mat or seed mat of the above type.

The present invention thus provides, in a first preferred aspect, a mulch mat comprising shredded paper pressed into a substantially mat-like form and a binder, said binder binding and maintaining said shredded paper in said mat-like form. Preferably the discrete strips of shredded paper have a width measurable or noticeable to the naked human eye. Typically the width of the pieces of shredded paper is 2–10 mm, preferably 2–6 mm, most preferably 3–5 mm. Typically the pieces of shredded paper are elongate with a length greater than their width, substantially greater than their width. As randomly oriented shredded paper is difficult to handle, the strips of paper would not typically have a length greater than 20 cm. Advantageously the strips of paper have a length of 6–8 cm.

Typically the strips of paper are obtained by shredding waste paper, newspaper or computer paper, in a conventional shredder of the type that is used in an office or industrial facility.

The product of this process is discrete pieces of paper which are separate from each other and each of which has a visibly discernible width and length. Thus the strips of paper are not akin to pulp fibres. The discrete pieces of paper are merely glued together and do not form a homogeneous mixture or porridge of pulped fibre. The shredded paper is most suitably used in a dry form.

The binder for binding the strips of the shredded paper together may comprise a glue, or latex.

The present invention in a further aspect provides a method of manufacturing a mulch mat from paper, said method including the steps of shredding said paper or providing said paper in shredded form, applying a binder to said shredded paper and pressing said shredded paper into a substantially planar form.

The shredded paper may be pressed by one or more rollers and suitably onto a continuous belt, so as to form a mat of elongated form. Alternatively the shredded paper may be pressed flat using a pressing apparatus, such as a flat platen.

The mat, after or during pressing, is suitably dried to substantially remove moisture in the end product. Drying of the mats during manufacture may be achieved through the application of heat with, for example, blowers.

Drying, however, may also be achieved by use of microwave drying techniques.

If desired, the mulch mat may incorporate a layer of thin paper such as a tissue paper on one or both sides to assist in binding the shredded paper into a mat-like form and to provide a preferred finish.

In a further aspect, the present invention provides a seed mat, said seed mat being formed of shredded paper pressed into substantially planar mat-like form and a binder for binding and maintaining said shredded paper in said mat-like form, and seed on or within said mat.

In a preferred form, the seed mat comprises two layers, each being formed of shredded paper material and the seed is disposed between the layers. The layers and the paper within each layer may suitably be bound together by a binder, such as a glue or latex or starch.

So as to promote the growth of seeds in the seed mat, the mat may be provided with a plurality of perforations. At least some of the seeds may be located adjacent some of the perforations so as to more easily allow root and/or stem growth. Preferably, the perforations through the mat are provided in a regular array or pattern.

The mats formed as above may be in continuous lengths so as to be capable of being rolled up and supplied in a rolled in form for subsequent unrolling and use in a planar form. Alternatively, the mats may be provided in any other shape, for example, of round shape with a central opening through which plant may grow or with a slot extending from the periphery of mat to the central opening to permit the mat to be located about a growing plant. In a preferred form, the mats may be of hexagonal shape which will facilitate the manufacture of a large number of mats from a continuous length with minimum waste.

The binder for the mat may comprise any suitable adhesive or liquid with adhesive properties. A particularly suitable adhesive comprises polyvinyl acetate (PVA) which may be mixed with water for spraying onto the mat. When the mat is subsequently dried, the adhesive binds the shredded paper together. The higher the concentration the PVA glue, the longer it will take to break down when subject to external weather conditions.

Either mat may incorporate an additive or additives. Such additives may comprise herbicides or insecticides. These may be natural or synthetic and applied internally or externally. Other additives may comprise slug or snail repellents or other pest repellents or pesticides, beneficial fungus, bacteria or viruses which may be genetically altered or not or nemacides. The mats may also incorporate plant growth promoters such as fertilisers and trace elements. The mat may be further incorporate super absorbents which may be of granular form to retain moisture in the mat.

The present invention provides, in a further aspect, a method of manufacturing a seed mat from paper, said method including the steps of shredding said paper or providing said paper in shredded form, applying a binder to said shredded paper, applying seed to said paper and pressing said shredded paper into a substantially planar form.

BRIEF DESCRIPTION OF DRAWINGS

In order that the invention may be more readily understood and put into practical effect, reference will now be made to the accompanying drawings which illustrate preferred embodiments of the invention and wherein:

FIG. 6 illustrates schematically an alternative form of apparatus for forming a mat according to the present invention; and FIG. 7 illustrates schematically an alternative arrangement for forming apertures through the mat.

MODES FOR CARRYING OUT THE INVENTION

Figure 1:
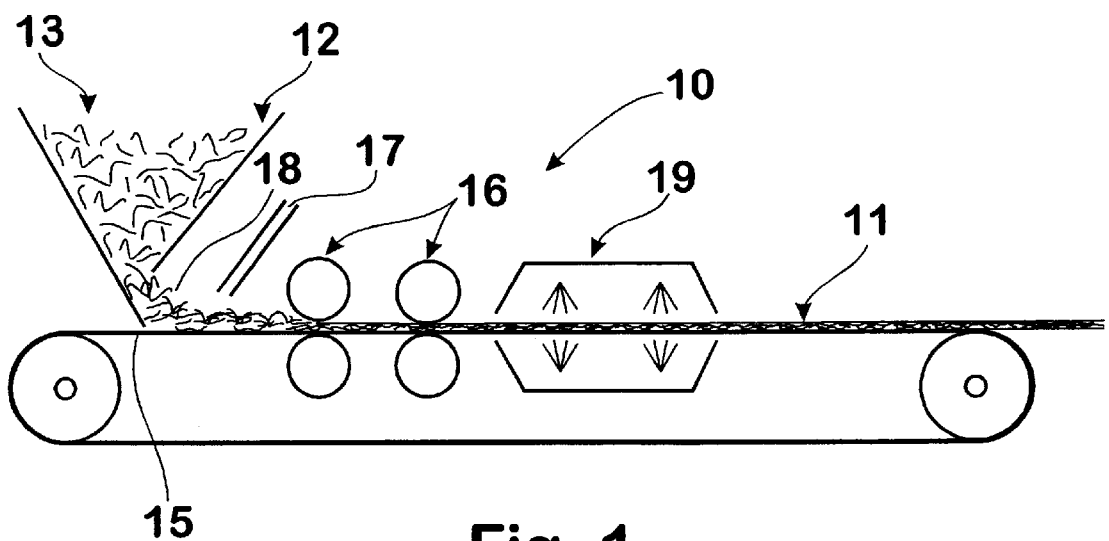
FIG. 1 illustrates the manner in which a mulch mat according to the present invention may be formed.
Figure 2:
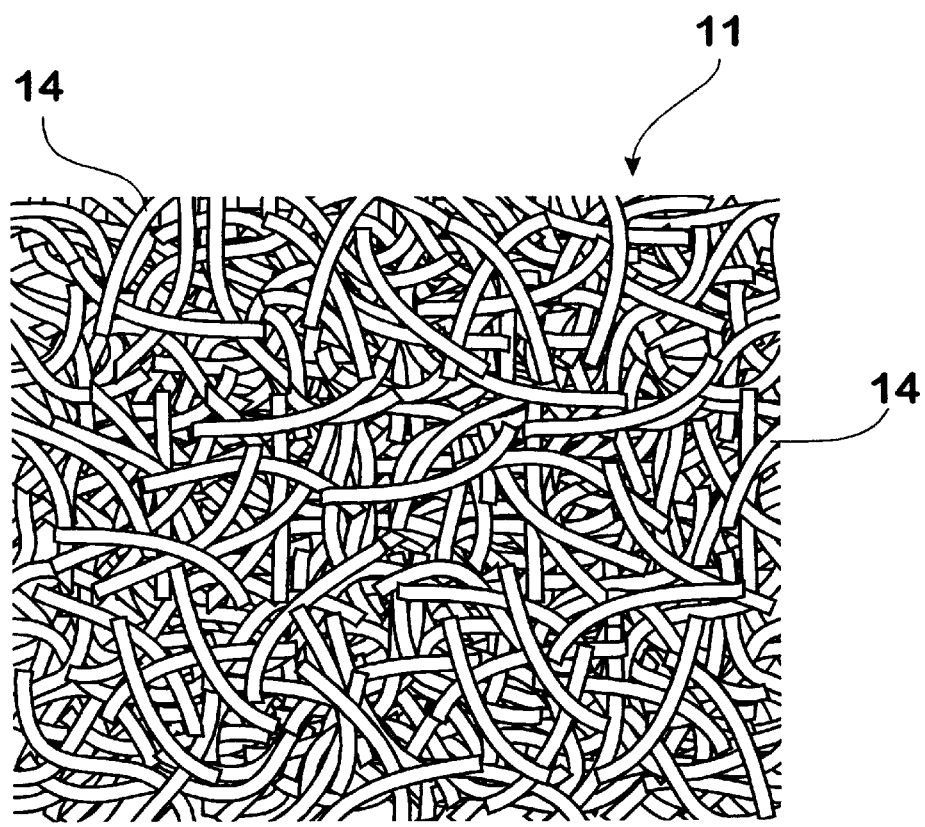
FIG. 2 illustrates a section of a mulch mat according to the present invention.

Referring to the drawings and firstly to FIG. 1, there is illustrated schematically an apparatus 10 according to the present invention for forming a mulch mat 11, a section of which is shown in FIG. 2. The apparatus 10 includes a hopper 12 which holds dry shredded paper 13 for formation into the mulch mat 11. The shredding paper 13 may be obtained from any conventional shredding process wherein waste paper such as newspaper or computer paper is severed into substantially continuous strips 14 by suitable cutting tools. The hopper 12 is located above an upper run of a continuously moving belt 15 and is arranged to deposit the shredded paper 13 onto the belt 15. Located downstream from the hopper 12 is a roller 16 or preferably one or more sets of opposed rollers 16 which are arranged to roll the shredded paper 13 flat onto the belt 15. A binder applicator 17 may be provided adjacent the hopper 12 to apply binder to the shredded paper 13 as it is falling from the hopper 12 onto the belt 15. A spreader 18 may be provided adjacent the hopper 12 to spread the shredded paper 13 evenly across the belt 15. Downstream from the rollers 16, dryers 19 of any suitable form may be provided on one or both sides of the mat 11 to remove moisture from the mat.

In operation, as the shredded paper 13 is deposited onto the belt 15, it is spread out across the mat 11 by the spreader 18 and the rollers 16 will cause the paper 13 to be rolled flat. At the same time, the adhesive or binder applied through the applicator 17 to the shredded paper will ensure that the strips 14 of the shredded paper 13 remain bound together. If desired, the roller 16 may be heated to reduce any moisture content in the shredded paper. This step will assist in the binding process. Alternatively, the paper 13, may be further dried by the application of external heat at the dryers 19 which for example may be simply heating elements or hot air blowers.

The mat 11 formed as above is sufficiently flexible to enable it to be rolled up into a roll and thereafter may be unrolled for use, for example, to lie flat on the ground around the trunks of trees or stems of plants to reduce weed growth.

Figure 3:
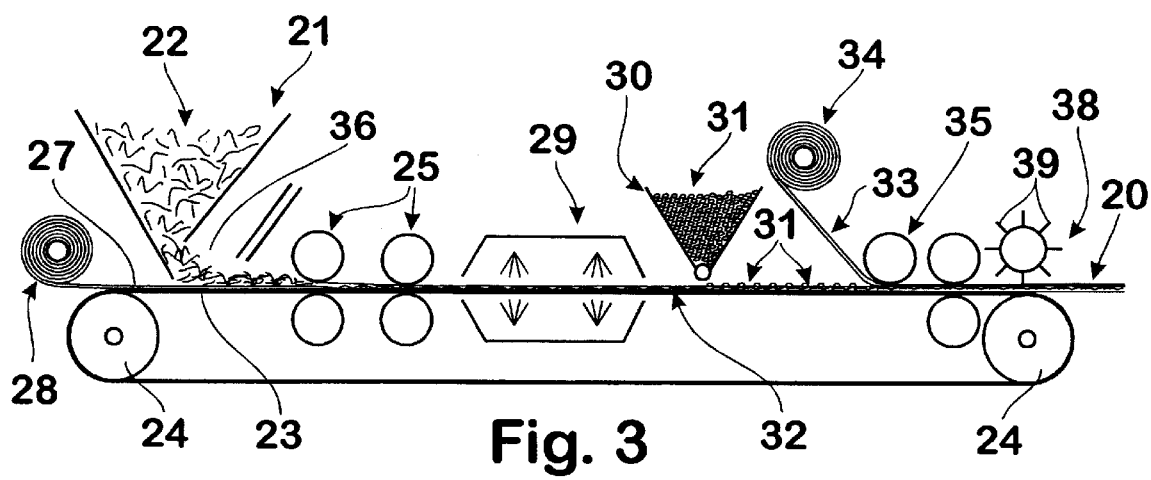
FIG. 3 illustrates the manner in which a seed mat according to the present invention may be formed.
Figure 4:
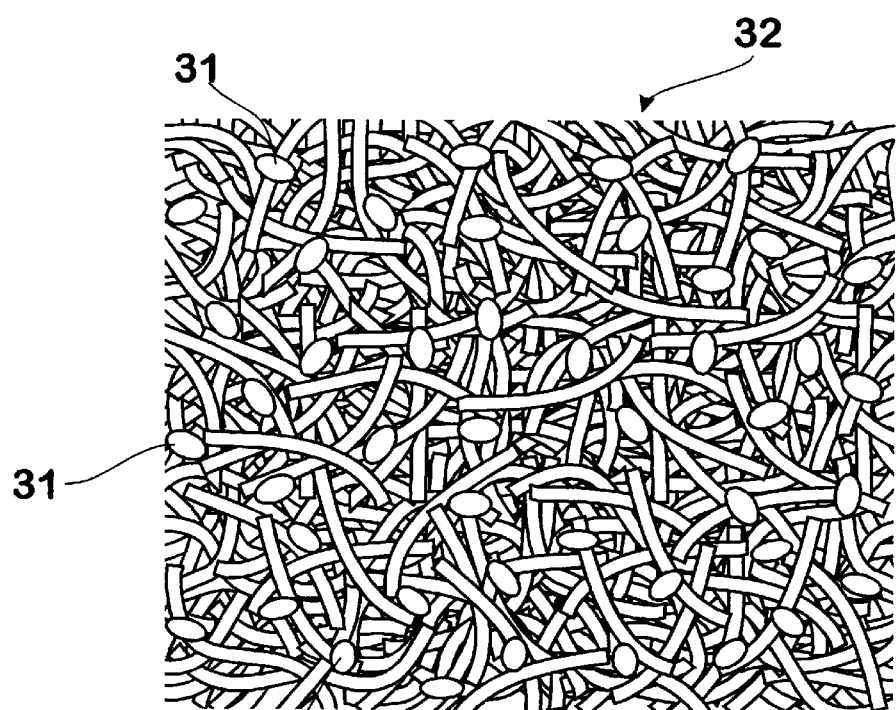
FIG. 4 illustrates a portion of a seed mat formed in accordance with the present invention.

Referring now to FIG. 3, there is illustrated another apparatus for forming a seed mat 20 according to the invention. In this arrangement, a similar apparatus to that described with reference to FIG. 1 may be used to initially produce a mulch mat. For this purpose a hopper 21 is provided for carrying shredded paper 22 for depositing same onto an endless belt 23. The belt 23, as before, may be supported about opposite end rollers 24, one or both of which may be driven. The shredded paper 22 is rolled flat onto the belt 23 by one or more rollers or sets of rollers 25 and a binder may be applied to the shredded paper 22 as it is deposited onto the belt 23. Additionally, if required, a thin paper, such as a tissue paper 27 may provide a backing upon which the shredded paper 22 may be deposited, the tissue paper 27 being supplied from a roll 28 onto an upper run of the belt 23 so as to move therewith. Dryers 29 are provided downstream from the rollers 25 to remove moisture from the paper 22 which may be inherent in the paper 22 or introduced from the binder or adhesive. A seed hopper 30 is provided for depositing seed 31 onto the rolled flat shredded paper mat 32. The paper mat 32 carrying seed 31 as shown in FIG. 4 may be used in this form with the seed 31 adhered to the mat 32.

Alternatively, a second layer of shredded paper may be applied over the previously formed mat 32 and seed 31. For this purpose a previously formed shredded paper mat 33 may be supplied in a roll 34, one side of which (the exposed side) may be provided with a layer of tissue paper. One or more rollers or sets of rollers 35 are provided to roll the mat 33 onto the mat 32 with the seed 31 therebetween. Adhesive or binder may be applied to maintain the mat layers 32 and 33 together. The seed mat 20, thus formed, comprises two layers of shredded paper which has been pressed flat between which seeds 31 are located. The layers of shredded paper which form the mat 20 are preferably thinner than the layers of the mulch mat 11 so as to enable more easier handling and rolling up of the mat 20.

As with the embodiment of FIG. 1, a spreader 36 may be located adjacent the hopper 21 to spread the shredded paper across the conveyor belt 23. The spreaders 18 and 36 in each apparatus may be of any suitable form, for example, in the nature of a rake or a blade.

In an alternative manner of construction of such a seed mat 20, a single previously formed mat 32 may be folded longitudinally in half by suitably configured rollers to sandwich the seed 31 between opposite halves of the mat 32. An adhesive or binder may be applied to hold the two halves of the mat together.

If desired, a fertiliser may be incorporated into the mat 20, for example, between the respective mat layers 32 and 33 to promote growth of the seeds 31. The fertiliser may be applied with the seed 31 via the hopper 30 or supplied from a separate hopper adjacent the seed hopper 30. Alternatively or additionally, additives as referred to above may be used instead of seed where a mat having plant growth promoting properties or other properties is required.

Figure 5:
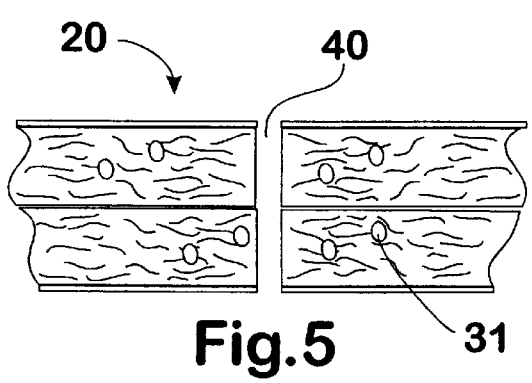
FIG. 5 illustrates, in sectional view, a portion of a seed mat with perforations therethrough.

The apparatus of FIG. 3 may additionally incorporate a punching roller 38 which may be provided on its periphery with a plurality of radially extending pins 39. During formation of the mat 20, the roller 38 will rotate with the mat 20 as it exits the roller 35 and the pins 39 will penetrate the mat 20 so as to form a plurality of apertures 40 through the mat 20 as shown in FIG. 5. The apertures 40 promote plant growth by more easily enabling the roots of seeds 31 as they germinate to pass through the mat 20 into the underlying soil and similarly more easily allow stems to pass upwardly through the mat 20. The seed depositing hopper 30 may be arranged such that the apertures 40 when formed through the mat 20 are located adjacent the seeds 31. This result may be achieved by having a timed release of individual seeds onto the mat 32 and transversely of the mat 32 to form rows extending transversely across the mat 20. The spacing of the penetrating pins 39 and speed of rotation of the roller 38 is then arranged such that the apertures 40 are formed in transverse rows with individual apertures 40 being located adjacent the respective seeds 31.

A seed mat 20, as formed above, may be used in many applications where grass, lawn or plant growth is to be promoted. The mat 20 may be simply rolled out flat in such an area and when subject to moisture, the seeds 31 will germinate but be held in the mat 20 so as not to be lost in erosion conditions or heavy rain. After a period of time, the binder will break down as may the mat 20. However, by this time, the grass, lawn or plant growth should be established.

In a simplified form and as referred to above, seeds 31 may be simply deposited on one side of a mat 11 or 32 and held thereto by the binder. Furthermore, in the second embodiment of FIGS. 3 and 4, additional binder may be required to hold the respective layers of the mat together. This may be applied during or after the formation process described.

Referring now to FIG. 6, there is illustrated a third alternative apparatus 41 for forming a mat according to the present invention. The apparatus 41 includes one or more conveyor belts 42 supported between spaced apart end rollers 43. First and second rolls of tissue paper 45 and 46 are provided to supply layers of tissue paper to form upper and lower layers 47 and 48 of the mat to be formed. A hopper 49 holds shredded paper 50 for supplying to the upper run of the conveyor belt 42. Adhesive applicator 51 are provided to apply adhesive to the shredded paper 50 as it passes through the hopper 49 onto the upper run of the first conveyor belt 42. The adhesive is preferably sprayed from the adhesive applicators 51 and may comprise for example, polyvinyl acetate (PVA) mixed with water. The hopper 49 may also incorporate a compressed air blower 52 to separate the paper strips and ensure full penetration of the adhesive. The blower 52 also serves to direct the paper onto the conveyor belt 42. The hopper 49 may further include a shredder 53 to further shred the paper deposited into the hopper 49 or to shred other paper deposited into the hopper. Sets of opposing rollers 55 are provided to compress the shredded paper 50 onto the upper run of the belt 42 and between the respective upper and lower layers of tissue paper 47 and 48 which is fed between the first and subsequent sets of rollers 55. Opposite cutter rollers 56 may be used to trim opposite sides of the roller flat shredded paper. The sets of rollers 55 ensure full compression and compaction of the shredded paper 50 as it passes along the conveyors 42. Heaters 57 which may comprise hot air blowers are arranged on opposite sides of the second conveyor 42 to heat and dry the shredded paper 50. Alternatively, heating may be provided by other heaters such as from a microwave source. An end roller 58 is provided adjacent the end roller 43 of the second conveyor 42 to provide final compression and guide a formed mat 59 onto a roller 60 on which it is stored for subsequent removal and use.

If additives are to be incorporated into the mat 59, they may be deposited adjacent but forwardly of the spreader 54. If desired, one of the set of rollers 55 may comprise at least one perforating roller to form openings through the mat 59 in the manner described with reference to FIG. 3.

Alternatively and as shown in FIG. 7, the mats may be punched using profiled punches 61 which may be a platen mounted on a roller. The punches 61 may be arranged in a regular array on a platen to form sets of apertures across the mat 59 for example at a spacing of 5 mm or 1 cm. Alternatively, the punches 61 may be located about the periphery of a roller as shown in FIG. 3. The punches 61 form in the mat 59 openings 62 which are enlarged on the upper side and tapered on their lower side where they penetrate the lower side of the mat. The enlarged portions of the openings 62 ensure that either a seed 31, or fertiliser pellets 63 and super absorbent particles 64 locate at least partially within the openings 62 as illustrated. In the mat 59 which is provided with the openings 62, sets of the openings 62 may carry seed 31, further sets may carry fertiliser pellets 63 and yet further sets may carry filler. Still further sets may carry super absorbent particles 64.

It is preferred that the binder be applied to the shredded paper before rolling flat as this sequence will ensure complete penetration into the paper strips. While in the embodiment of FIG. 6, tissue paper either is provided on both sides, such paper may only be provided on one side of the mat or may be eliminated. Similarly, such paper may be used on one or both sides of the mat 59. The tissue or thin paper, in addition to providing an improved finish to the mat, also prevents adhesion between the binder impregnated shredded paper and the pressing roller and/or belt.

In an alternative method of construction of the mat 20 in FIG. 3, the roll 34 may be replaced by a further hopper which carries shredded paper as the hopper 21 and which is deposited and compressed onto the mat 32 with the seed 31 located therebetween.

In yet a further embodiment, mat 20 may be prepared and placed in a juxtaposed position to sandwich seed 31 therebetween. Such mat sections may be held together by any suitable binders.

If desired, a coloring may be added to any mat to enhance the appearance of the mat in use. For example, the color may be green to match a lawn or grass area. The thickness of the mat may be varied by quantities of paper deposited from the holding hopper and the depth to which the paper is spread across the belt by the spreader associated therewith. The paper strips which form the shredded paper may of course by of any width according to the nature of the shredding apparatus. Shredders may also be incorporated into the hoppers which supply the paper for compression or located adjacent to the hoppers.

Where a seed mat 20 is used, the seed 31 may comprise grass or lawn seed or, for example, may comprise herb seed or flower seed for use in indoor or outdoor gardens.

While the seed is preferably deposited onto the mat through a hopper arrangement, it may be deposited in any other manner onto the mat.

While the above has been given by way of an illustrative embodiment of the invention, all such modifications and variations thereto as would be apparent to persons skilled in the art are deemed to fall within the broad scope and ambit of the invention as defined in the appended claims.

What is claimed is:

1. A horticultural mat comprising:
   a plurality of discrete strips of shredded paper oriented randomly relative to each other and pressed into a flexible and substantially planar rollable mat having opposed sides, each of the strips having a width of 2 to 10 millimeters;
   a binder loosely binding the discrete strips of shredded paper to each other at points along their lengths to form the mat; and a backing sheet applied to one side of the flexible and rollable mat to enhance the strength of the mat.

2. A mat according to claim 1, wherein said shredded paper strips have a width of 2–6 mm and are obtained by shredding waste paper.

3. A mat according to claim 1, wherein said binder comprises one of a glue and a latex, and wherein said backing sheet is made of paper.

4. A mat according to claim 1, wherein a further backing sheet of paper is applied to another side of said mat.

5. A mat according to claim 1, including at least one beneficial additive selected from the following: herbicide, insecticide, pest repellent, pesticide, fungus, bacteria, virus, nemacide, fertilizer, and super absorbent.

6. A mat according to claim 1, wherein said mat is a seed mat including paper shredded into substantially randomly oriented strips and pressed into a substantially planar mat, a binder for binding and maintaining said shredded strips of paper in said mat, and seeds mounted on or within said mat.

7. A seed mat according to claim 6, wherein said shredded strips of paper are provided in two layers and wherein said seeds are disposed between said layers.

8. A seed mat according to claim 7, wherein said two layers are bound together by a binder.

9. A seed mat according to claim 8, wherein said mat includes a plurality of perforations defined therein and at least some of said seeds are located adjacent said perforations.

10. A seed mat according to claim 6, wherein said binder includes polyvinyl acetate, starch or latex.

11. A seed mat according to claim 10, including an additive selected from one or more of the following: a fertiliser or other plant growth promotor, a fungicide, a super absorbent, a slug or snail repellent or other pest repellent, and a nemacide.

12. A method of manufacturing a horticultural mat from paper, said method comprising the steps of:

provides a plurality of discrete strips of shredded paper oriented randomly relative to each other and a backing sheet;

depositing the strips of shredded paper loosely onto the backing sheet;

applying a binder to said discrete strips of shredded paper at points along their lengths; and pressing said strips of shredded paper and said backing sheets into a form of a flexible and substantially planar rollable mat having opposed sides.

13. A method according to claim 12, wherein said step of pressing said strips of paper into a mat includes passing the strips of shredded paper through a nip region of a pair of opposed rollers.

14. A method according to claim 13, further comprising the step of passing the mat through a nip region of a second pair of opposed rollers longitudinally spaced from each other.

15. A method according to claim 13, wherein the step of depositing the strips of shredded paper loosely onto the backing sheet includes discharging the strips of shredded paper from a hopper onto a conveyor at a hopper discharge point.

16. A method according to claim 15, further comprising the steps of supplying the backing sheet in roll form and unrolling the backing sheet onto the conveyor upstream of the hopper discharge point such that the strips of shredded paper discharge from the hopper onto the backing sheet.

17. A method according to claim 15, further comprising the steps of applying the binder to the mat at a binder application point downstream of the hopper discharge point, spreading the strips of shredded paper substantially evenly across a width of the conveyor with a spreader after the strips are discharged onto the conveyor, and drying the mat by applying heat so as to substantially remove moisture therefrom.

18. A method of manufacturing a horticultural mat from paper, according to claim 12, said method further comprising the step of:

adding seeds to said mat.

19. A method according to claim 18, wherein the step of adding seeds to the mat includes placing the seeds at intervals along a length of the mat after the strips of shredded paper have been pressed into the mat, and applying a second backing sheet to an opposite side of the mat to cover the seeds so that the seeds are received internally within the mat.

* * * * *